(No Model.)  2 Sheets—Sheet 1.

M. P. SCHENCK.
CIDER AND WINE PRESS.

No. 258,134. Patented May 16, 1882.

Attest:
Geo. T. Smallwood Jr
L. M. Hopkins

Inventor:
Marcus P. Schenck
By Knight Bros
attys.

(No Model.) 2 Sheets—Sheet 2.

M. P. SCHENCK.
CIDER AND WINE PRESS.

No. 258,134. Patented May 16, 1882.

Attest:
Geo. T. Smallwood Jr
L. M. Hopkins

Inventor:
Marcus P. Schenck
By Knights Bros
attys.

UNITED STATES PATENT OFFICE.

MARCUS P. SCHENCK, OF FULTON, NEW YORK.

CIDER AND WINE PRESS.

SPECIFICATION forming part of Letters Patent No. 258,134, dated May 16, 1882.

Application filed October 18, 1881. (No model.)

*To all whom it may concern:*

Be it known that I, MARCUS P. SCHENCK, of Fulton, Oswego county, New York, have invented Improvements in Cider-Presses, of which the following is a specification.

My improvement relates to a cider-press adapted for pressing successive cheeses and delivering the cider into separate receptacles, one cheese being laid up while the previous cheese is being pressed, and the cider drained and discharged from the two being separately received and retained.

The invention further relates to an improved press-board for discharging the juice from the separate layers of the cheese independently, instead of its being forced or caused to drain from the upper drain through the lower layers, as with cheese-racks heretofore used.

The invention further relates to an alarm and automatic device for stopping the operation of the press when any desired degree of pressure is reached.

In order that the invention may be fully understood, I will proceed to describe it with reference to the accompanying drawings, in which—

Figure 1:
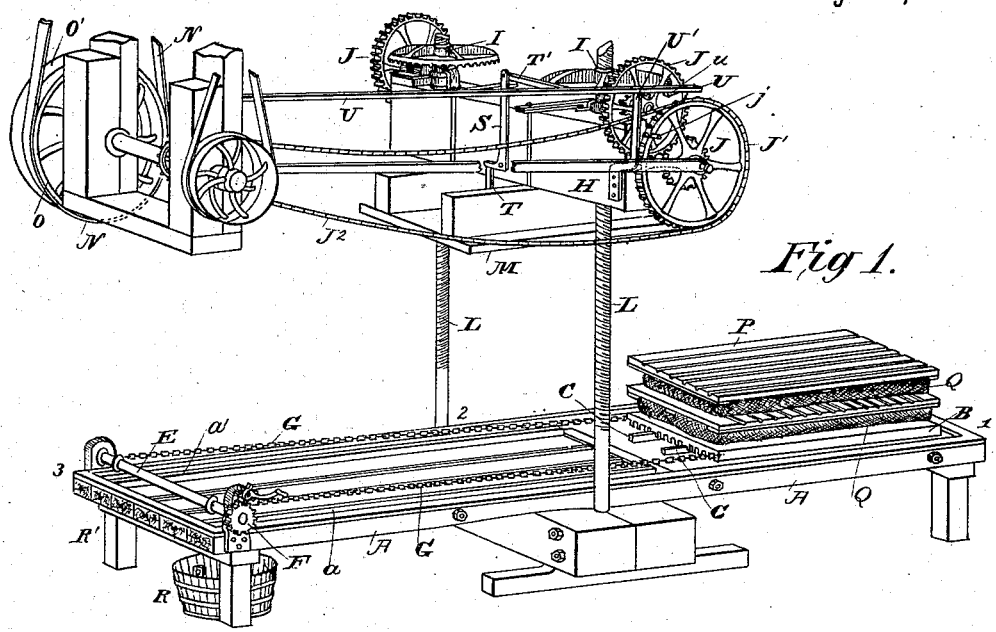
Figure 2:
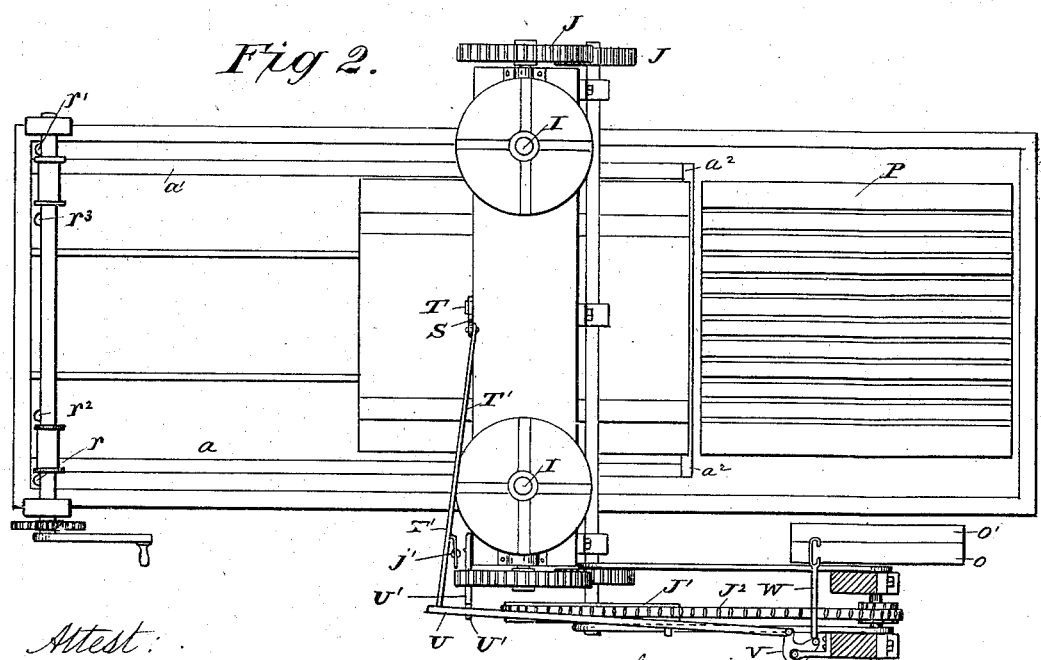
Figure 3:
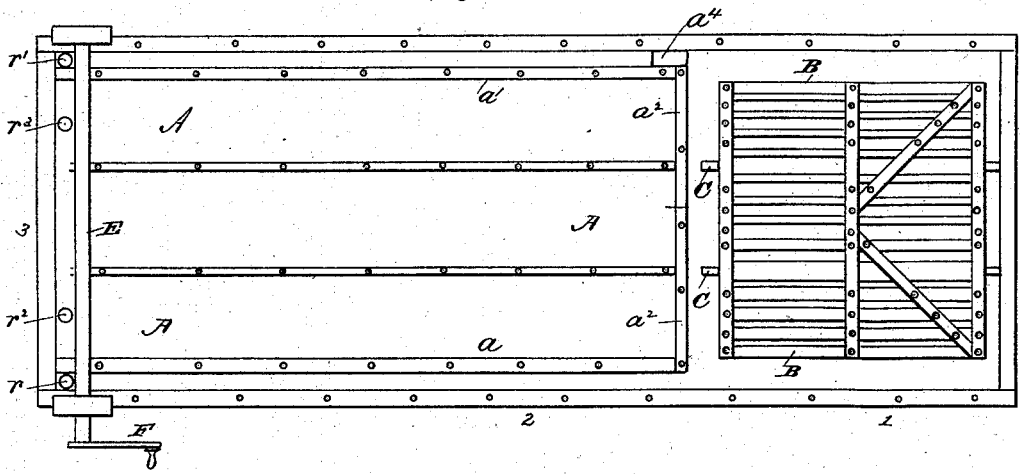
Figure 4:
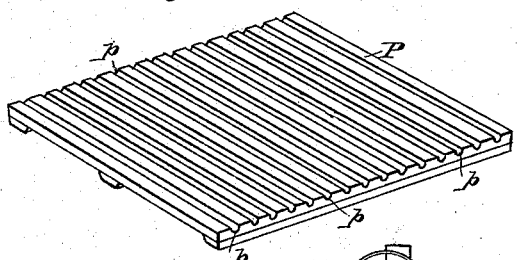
Figure 5:
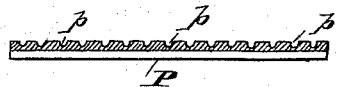
Figure 6:
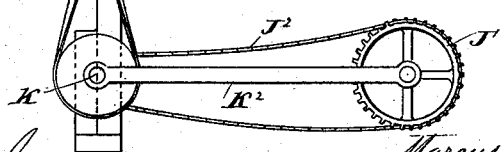

Figure 1 is a perspective view of a press illustrating the invention. Fig. 2 is a plan of the same with the driving mechanism reversed. Fig. 3 is a plan of the bed and the traveling rack mounted thereon. Figs. 4 and 5 are respectively a perspective view and a vertical section of one of the improved press-boards formed with U-shaped grooves for draining the juice, as hereinafter described. Fig. 6 is a vertical transverse section of the press.

A represents a bed or platform supporting the sliding rack or table B, which, when in the position for laying up the cheese, rests on elevated rails C C, and when the cheese is laid up is moved into position beneath the press-beam and follower, resting solidly on the bed A for receiving the pressure.

E represents a horizontal shaft extending transversely across the platform A, mounted on suitable bearings thereon and rotated by a crank and pinion, F, or other suitable means. Upon said shaft are coiled chains G G, attached to the sliding carriage or table B, for the purpose of moving the same, with the cheese upon it, from the point 1, where it is laid, up to the point 2, beneath the press-beam H and follower M. The said beam is operated by nuts I, driven by gearing J J J', and a chain, J², from a counter-shaft, K, and working on vertical screws L L. For hand-presses of smaller size a single beam is employed, and this may be worked by crank-gearing. For large power-presses I employ two beams with four screws and drive the counter-shaft by means of a belt, N, and pulley O, O' representing an idle or loose pulley on the same shaft, to which the belt is shifted when the press is to be stopped, as hereinafter described.

My improved press-board is shown at P, and in detached views in Figs. 4 and 5. It is made with any desirable number of U-shaped grooves, $p$, forming channels for the expressed juice, and causing the same to be carried to the outside of the cheese, instead of draining through the subjacent layers of the cheese, as with open racks in common use.

Q represents the customary cloth in which the pomace is laid up on the grooved press-boards. The platform A is provided with longitudinal cleats $a\ a'$ near each side, for conducting the juice to the discharge end 3 thereof from the cheese being laid up at 1, and with a transverse cleat, $a^2$, by which the juice is conducted to the channels formed by the side cleats, $a\ a'$. These cleats are thus arranged to form separate channels on the respective sides of the platform, through either of which the juice may be caused to flow by movable plugs or stops $a^4$ placed on one or the other side, so as to close either of the channels. I am thus enabled to open either one of the channels formed by the cleats $a\ a'$ on the opposite sides of the platform, so that the juice drained from the cheese which is laid up at the point 1 may be conducted by the cleat $a$ and delivered through the hole $r$ to a receptacle at R, at one side of the platform, while from another cheese, which is under pressure at the point 2, the juice is discharged and drained through the hole $r^3$ to another receptacle at R', the hole $r^2$ being plugged. Then when the pressing is completed the press is run up, the pressed cheese moved forward to the end 3 for taking it down, the new cheese is moved under the press, and the plug removed from $r^2$ to $r^3$, so that the expressed juice will pass through the hole $r^2$ into the receptacle R, which received the drainings from the same cheese while being laid up. This provision is of great utility and convenience in a custom-press, enabling the operator to press the apples of different customers in succession, delivering the juice from each into its appropriate receptacle and causing the work of draining from the cheese which is being laid up and from that which is under pressure to go on without interruption or interference.

In a power-press it is important to limit the pressure to a proper maximum. In order that this may be effected, I employ a lever, S, fulcrumed on the face of the press-beam and actuated by a push-rod, T, driven against its shorter horizontal arm by the springing of the follower M, causing an increased movement to the longer upper end of the lever S in a horizontal direction, and through the medium of a transverse rod, T', shifting the alarm-bar U laterally, so that it will be struck by a tappet on the wheel J and cause the ringing of a bell, $j'$, each time the said tappet comes round. If the press is not stopped, the continued springing of the follower M thrusts the bar U completely off its support U', at which time a tooth or lug, $u$, on said bar comes in the path of the tappet $j$, said tappet being thus made to draw or push the bar U endwise, and causing it, through the medium of a bell-crank lever, V, and a belt-shifter, W, attached thereto, to throw the belt N from the driving-pulley O to the idle-pulley O', and thus stop the operation of the press.

In order that the driving-chains $J^2$ may have an equal and proper tension in all positions of the press-beam H, the counter-shaft K runs in swinging hangers K', connected to the beam by a rigid strut, $K^2$, boxed onto the shaft or otherwise connected at its ends to the hangers and beam, so as to adapt it to follow the press-beam as the latter descends, as illustrated in Fig. 6, and maintain an equal tension of the driving-chain $J^2$ at all points. The press-beam is thus relieved of horizontal strain, and the necessity for a head-block or upper framing is dispensed with.

My separate grooved press-boards, which are employed in place of the open racks in customary use, possess a great advantage in pressing the pomace by keeping each layer by itself and not permitting the juice from one layer to drain into the layer below it. The effect of this improvement is to press the respective layers of the cheese as dry as possible, leaving no juice between them in the grooves to drain into the layer below or to be absorbed by the spongy mass of pressed pomace when the press is run up. The said press-boards are preferably made of bass-wood about three-eighths of an inch thick, the U-shaped grooves $p$ being planed lengthwise of the boards a quarter to three-eighths of an inch wide at the top, and leaving a thickness of one-eighth of an inch uncut between the two layers of pomace, the board thus forming a shelf to make a perfect drain for the cheese, as well as a rack which is quite effective for carrying off the juice, and is easy to keep clean from slime and filth, the upper side being grooved in the manner described, while the lower side may be either similarly grooved or may be smooth.

Having thus described my invention, the following is what I claim as new therein and desire to secure by Letters Patent:

1. In combination with a cider-press, the double or extension platform A, provided with a sliding rack or carriage, B, for shifting the cheese from the place where it is laid up to the place of pressing, substantially as set forth.

2. The traveling rack or carriage B, traveling on ways C C, elevating it above the bed for draining and giving it a firm bearing thereon for pressing, substantially as described.

3. In a cider-press, a double or extension platform adapted for the laying up of a cheese at one point and the pressing thereof at another point, and with cleats $a\ a'\ a^2$, and separate discharge-openings $r\ r'$ for delivering the juice into different receptacles.

4. The combination of the beam H, follower M, push-rods T T', lever S, alarm-bar U, and tappet-wheel J $j$, for sounding an alarm when the press approaches the proper limit of strain, substantially as set forth.

5. The combination, with a cider-press, of the automatic belt-shifting device for throwing the driving mechanism out of gear by the springing of the follower when the press reaches the proper limit of strain.

6. In a cider-press, the combination of a moving beam, H, and a counter-shaft, K, the latter running in swinging hangers K' and connected to the beam and its gearing by a strut, $K^2$, and driving-chain $J^2$, so that an equal tension of the said chain will be maintained in different positions of the beam.

MARCUS P. SCHENCK.

Witnesses:
OCTAVIUS KNIGHT,
JOHN L. CONDRON.